United States Patent [19]
Chamot

[11] Patent Number: 5,188,287
[45] Date of Patent: Feb. 23, 1993

[54] THERMOSTAT ACTUATED BY AN EXPANDING WAX CAPSULE AND INCORPORATING A SAFETY DEVICE

[75] Inventor: Jean-Pierre Chamot, Arpajon, France

[73] Assignee: Procedes Vernet, Ollainville, France

[21] Appl. No.: 784,209

[22] Filed: Oct. 31, 1991

[30] Foreign Application Priority Data

Nov. 5, 1990 [FR] France .................. 90 13669

[51] Int. Cl.⁵ ............................................. F01P 7/16
[52] U.S. Cl. ................... 236/34.5; 236/93 R; 236/DIG. 2
[58] Field of Search .......... 236/34.5, DIG. 2, 34, 236/93 R, 101 R

[56] References Cited

U.S. PATENT DOCUMENTS

| | | | |
|---|---|---|---|
| 2,690,874 | 10/1954 | Stubblefield | 236/DIG. 2 |
| 3,498,537 | 3/1970 | Wong | 236/DIG. 2 |
| 3,776,457 | 12/1973 | Cardi | 236/34.5 |
| 4,227,646 | 10/1980 | Hart et al. | 236/93 R |
| 4,353,500 | 10/1982 | Brown | 236/34.5 |
| 4,353,501 | 10/1982 | Brown | 236/34.5 |

FOREIGN PATENT DOCUMENTS

| | | |
|---|---|---|
| 59-6480 | 1/1984 | Japan. |
| 60-59371 | 4/1985 | Japan. |
| 60-69372 | 4/1985 | Japan. |
| 1091666 | 11/1967 | United Kingdom. |

*Primary Examiner*—William E. Tapolcai
*Attorney, Agent, or Firm*—Larson and Taylor

[57] ABSTRACT

A thermostat is actuated by a wax capsule adapted to operate on a main valve disposed in a fluid circuit immediately the temperature of the wax capsule exceeds a predetermined threshold. It comprises arrangements made at least in part from a single-acting memory alloy adapted to contribute to the operation of the thermostat only when their temperature is less than the transformation temperature of the alloy and to condition the flow of the fluid in the thermostat in the same direction as if the wax capsule had operated normally if the transformation temperature of the memory metal is exceeded.

13 Claims, 9 Drawing Sheets

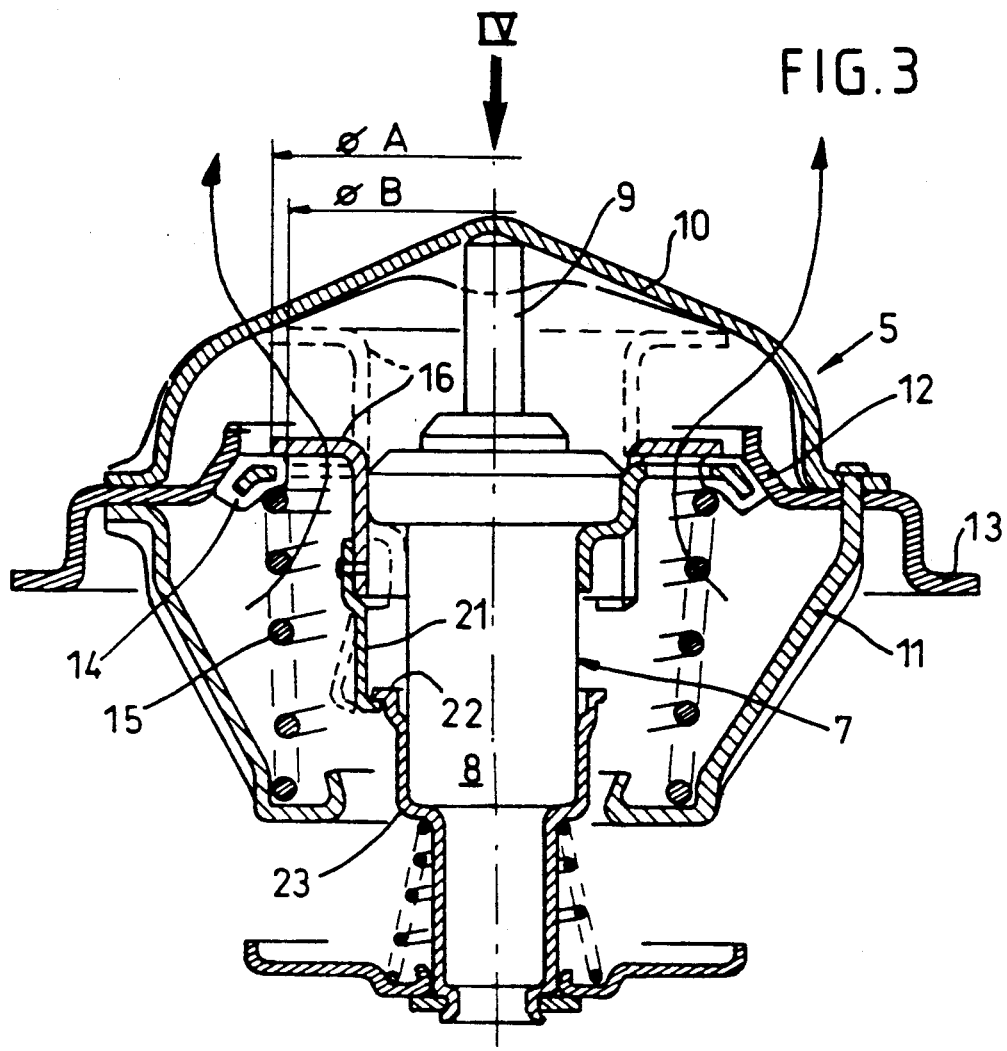
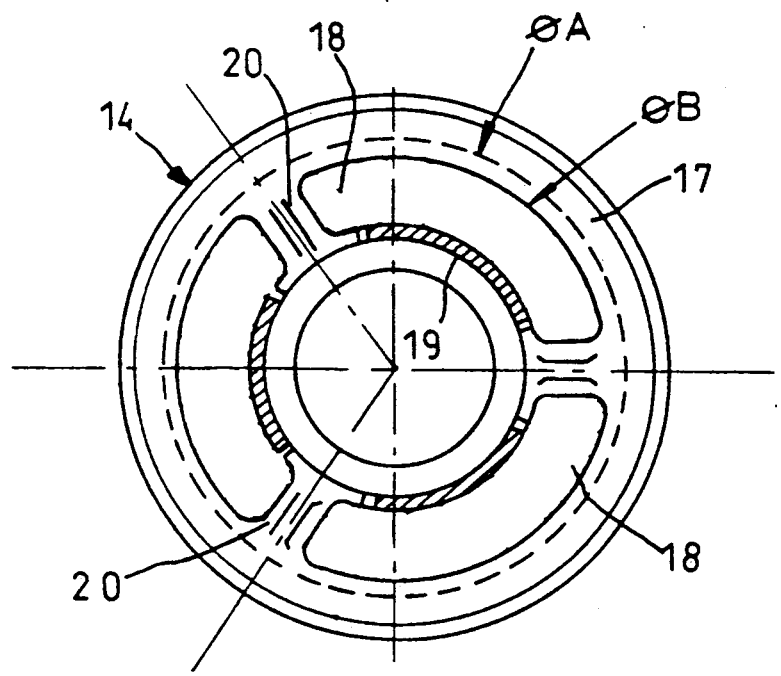

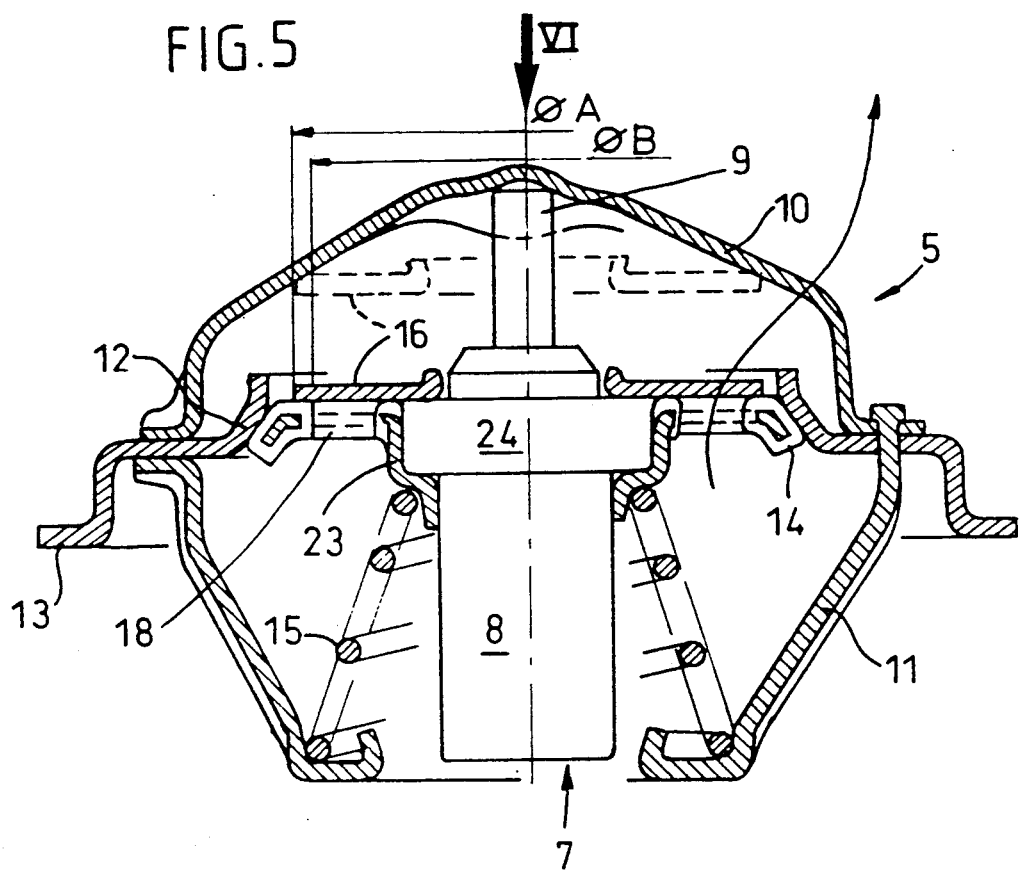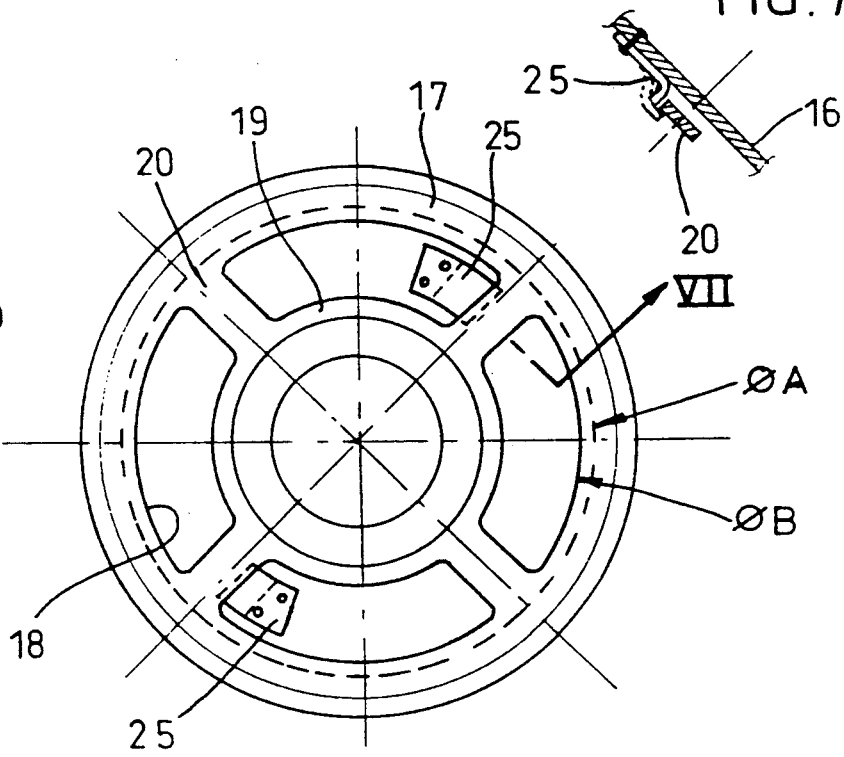

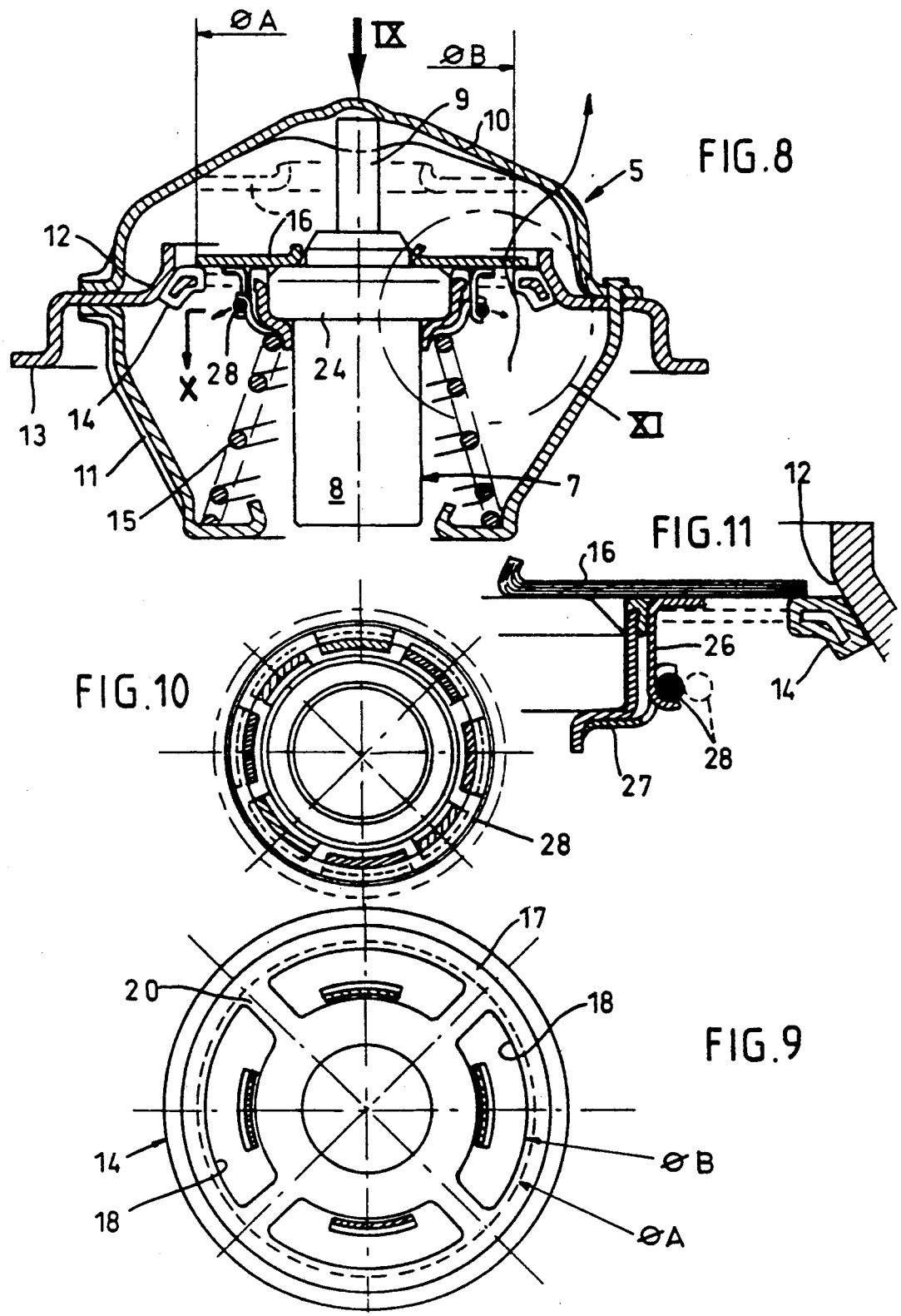

THERMOSTAT ACTUATED BY AN EXPANDING WAX CAPSULE AND INCORPORATING A SAFETY DEVICE

BACKGROUND OF THE INVENTION

1. Field of the Invention

The invention concerns thermostats actuated by a wax capsule which, by virtue of relative movement between a casing and a piston of the wax capsule caused by thermal expansion of the wax, is adapted in normal operation to open a main valve in a fluid circuit immediately after the temperature of the wax capsule exceeds a predetermined threshold whereas this main valve is closed below this threshold.

2. Description of the Prior Art

The most widespread applications of such thermostats include cooling liquid circuits of internal combustion engines. In this case the thermostat is disposed in the engine cooling liquid circuit so as to bypass a radiator associated with the engine when the temperature of the cooling liquid leaving the engine is below said threshold and otherwise to pass the cooling liquid leaving the engine through the radiator to cool it before it is returned to the engine after cooling.

Thermostats of this kind usually operate satisfactorily but the piston of the wax capsule may jam in its casing in a position such that the main valve is closed even if the temperature of the wax capsule reaches and exceeds said threshold. This can cause serious damage to the engine compromising its service life and/or the manufacturer's warranty, especially in the case of a vehicle engine. If the user of the vehicle whose engine has been damaged in this way makes a claim under the warranty, it is very difficult for the dealer to determine whether the damage is due to failure of the thermostat or to negligence on the part of the vehicle user, who may (for example) have neglected to take note of the cooling liquid temperature indicator lamp and continued to run the engine without taking the action appropriate to such circumstances.

Similar faults can occur in boilers fitted with this type of thermostat, as will be explained later with reference to the figures.

An object of the invention is to provide a safety device for thermostats which operates in a simple and secure way, which alleviates possible failure of the thermostat and in particular of its wax capsule and which provides an indication to the user that failure has occurred.

Another object of the invention is to provide a safety device for internal combustion engines providing an unambiguous indication that damage resulting from overheating of the cooling fluid could have been avoided by the user taking the appropriate supervisory and maintenance action.

With the aim of achieving the above objects the document GB-A-1.091.666 describes a thermostat for an engine cooling circuit which is not actuated by a wax capsule and the main valve of which is provided with an aperture normally closed by a plate held in place by a low melting point alloy. If overheating occurs the alloy melts and opens the aperture by releasing the plate. A safety device of this kind, although it is irreversible as required by the present invention, has the disadvantage that the molten solder may be entrained in the flow and block the engine cooling circuit.

A supplementary object of the invention is to provide the thermostat with an irreversible safety device, that is to say a device requiring action by a specialist to repair or replace the thermostat, without the specialist needing to work on the remainder of the fluid circuit, for example to remove from it solder entrained in the flow as described above.

SUMMARY OF THE INVENTION

The present invention consists in a thermostat actuated by a wax capsule comprising a casing and a piston and containing wax which thermostat by virtue of relative movement between said casing and said piston caused by thermal expansion of said wax is adapted in normal operation to a main valve disposed in a fluid circuit immediate after the temperature of said wax capsule exceeds a predetermined first threshold, said main valve being closed below said threshold, said thermostat incorporating safety means adapted not to contribute to the operation of said thermostat if their temperature is below a second threshold slightly greater than said first threshold but to condition the flow of fluid in the thermostat, if the second threshold is exceeded, in the same manner as if said wax capsule had operated normally, irrespective of the status of said wax capsule, wherein said safety means incorporated in said thermostat are made at least in part from a single-acting memory alloy whose transformation temperature is approximately equal to said second threshold. In a preferred embodiment of the invention applied to a cooling liquid circuit said safety means incorporated in said thermostat comprise an auxiliary valve in parallel with said main valve and normally closed by shape memory alloy retaining means adapted to open said auxiliary valve after transformation of said alloy at least during flow of said fluid.

The peculiar property of "memory" alloys, usually copper alloys such as CuZnAlNi or CuAlNi, is that they retain their mechanical properties and in particular their shape (shape memory alloy) at temperatures below their transformation temperature (or temperature range) but change their mechanical properties and in particular their shape above this temperature, which can be varied with adequate accuracy by varying the composition. Single-acting alloys of this kind are distinguished from double-acting alloys in that their transformation is not totally reversible. They are available through the usual trade channels, for example from the French company TREFIMETAUX or the US company RAYCHEM.

The thermostat provided with the safety device in accordance with the invention operates in the same way as a conventional thermostat provided that the temperature of its capsule does not exceed its setting threshold. If failure of the wax capsule causes the threshold to be exceeded and the transformation temperature of the alloy constituting the retaining system in the preferred embodiment is exceeded, this system ceases to operate and the auxiliary valve is opened permanently, at least for as long as the cooling fluid flows, so that the fluid can be kept at a temperature below said threshold. Because the shape memory metal is of the single-acting type, the retaining system cannot be reset without demounting the thermostat and in the case of a vehicle engine thermostat the driver can be made aware of the failure and the temporary remedy (the opening of the auxiliary valve) because the engine temperature and, during winter, the temperature of the vehicle interior heated by extracting heat from the cooling circuit, remain abnormally low. During subsequent repair of the vehicle, examination of the thermostat shows unambiguously whether the safety device operated because of technical failure of the thermostat or negligence on the part of the user.

The safety device operates in a comparable manner if instead of an auxiliary valve it comprises, for example, a memory alloy spring acting in opposition to the main spring tending to close the main valve, which is then the only valve.

Note that with the single-acting memory alloy there is no risk of entrainment in the flow of any material likely to block the fluid circuit, unlike the disclosure of the document GB-A-1.091.666.

Note also that various safety devices using memory alloys have already been proposed (see, for example, the documents JP-A-59 6480, 60 69371 and 60 69372), but these are double-acting memory alloys with the result that the safety device is reversible and therefore cannot indicate afterwards whether it has operated or not and consequently whether the user has neglected to take the necessary supervisory and maintenance action.

The invention will now be described in more detail with reference to the embodiments shown in the appended drawings.

BRIEF DESCRIPTION OF THE DRAWINGS

FIGS. 3 and 4 respectively show in axial cross-section a thermostat according to a first embodiment of the invention and, as seen in the direction of the arrow IV in FIG. 3, the main valve of this thermostat.

FIGS. 5 and 6 respectively show in axial cross-section a thermostat according to a second embodiment of the invention and, as seen in the direction of the arrow VI in FIG. 5, the main valve of this thermostat.

FIG. 7 is a detail view in cross-section on the line VII in FIG. 6.

FIGS. 8 and 9 respectively show in axial cross-section a thermostat according to a third embodiment of the invention and, as seen in the direction of the arrow IX in FIG. 8, the main valve of this thermostat.

FIG. 10 is a view in cross-section on the line X in FIG. 8.

FIG. 11 shows to a larger scale the detail indicated by the circle XI in FIG. 8.

DETAILED DESCRIPTION OF THE INVENTION

Figure 1:
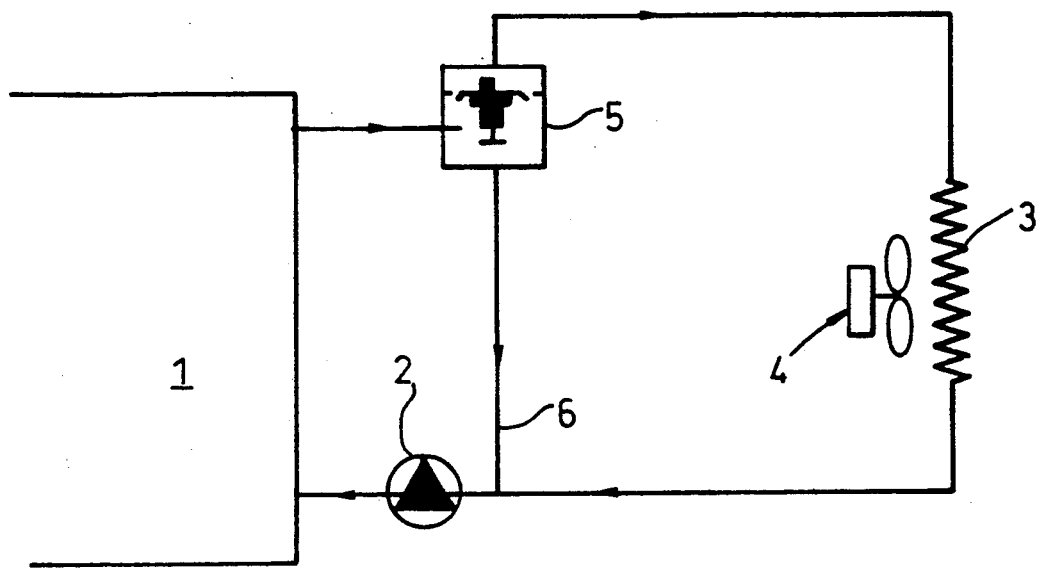
FIGS. 1 and 2 are schematic representations of two conventional internal combustion engine cooling circuits.
Figure 2:
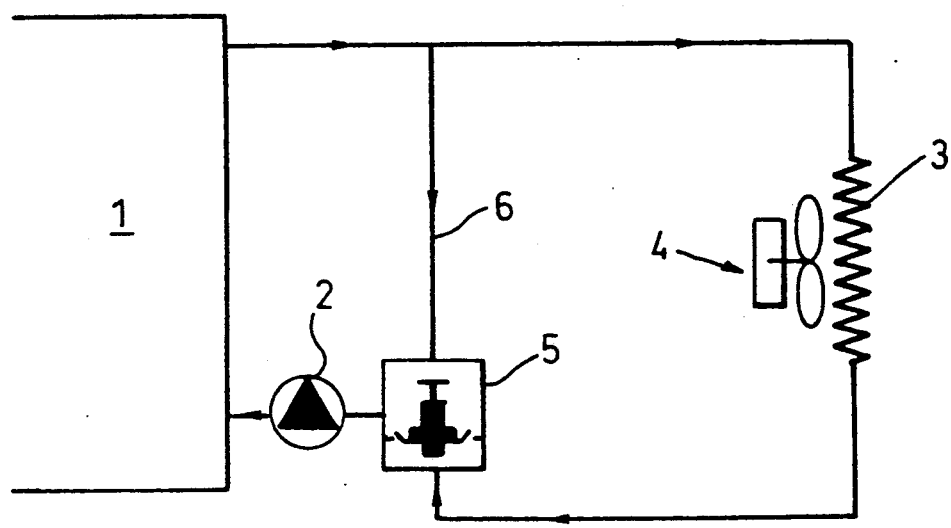

Before describing the invention it would be as well to outline with reference to FIGS. 1 and 2 the construction of conventional cooling circuits for internal combustion engines. The cooling liquid of the engine 1, which is circulated in the direction of the arrows by a pump 2, passes when its temperature exceeds a specific threshold through a radiator 3 associated with a fan 4. When its temperature is below this threshold the cooling liquid is diverted by the thermostat 5 to a bypass 6 which effectively "short-circuits" the radiator 3. The thermostat 5 may be mounted at the outlet from the engine 1, as shown in FIG. 1, or at its inlet, as shown in FIG. 2.

Figure 12:
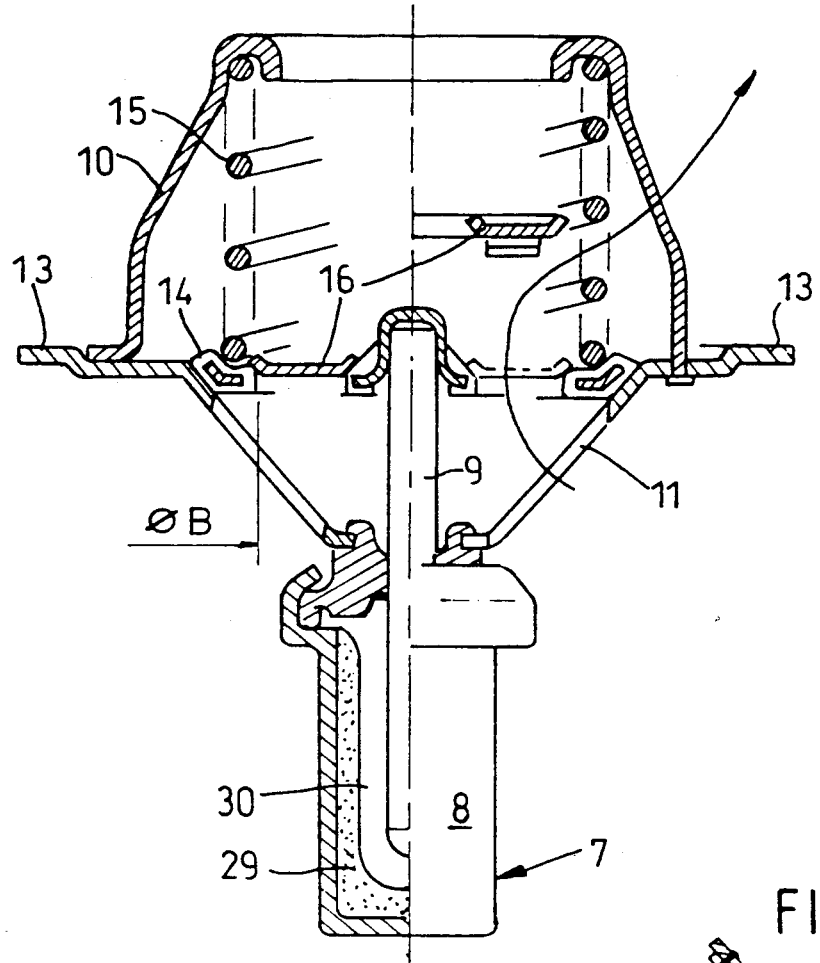
FIGS. 12 and 13 respectively show in axial cross-section a thermostat according to a fourth embodiment of the invention and, as seen in the direction of the arrow XIII in FIG. 12, the main valve of this thermostat.

Referring to FIG. 3, the thermostat 5 is actuated by a known type wax capsule 7 comprising a casing 8, a piston 9 and expandable wax (not shown) accommodated in the casing 8 and against which the piston 9 bears, usually through a sealed diaphragm (not shown). FIG. 12 shows the wax 29 and the diaphragm 30. The thermostat 5 has a relatively rigid framework comprising upper arms 10 and lower arms 11 (the terms "upper" and "lower" are used with reference to the FIG. 3 representation only), with gaps between them, and a frustoconical seat 12 extended outwardly by a mounting flange 13. The piston 9 bears on the upper arms 10 and the casing 8 is connected in a manner to be described later to a main valve 14 urged towards the seat 12 by a spring 15 bearing on the lower arms 11. The capsule 7 is immersed in the cooling liquid leaving the engine 1. When it is cold the piston 9 is largely retracted inside the casing 8 and the spring 15 holds the main valve 14 against the seat 12, which prevents the liquid from flowing through the seat 12. This is the FIG. 1 situation in which the liquid is diverted to the bypass 6. However, when the capsule 7 is hot, the piston 9 projects further from the casing 8 as the capsule 7 expands lengthwise, which lowers the casing 8 and consequently the main valve 14 against the action of the spring 15 and allows at least some of the cooling liquid circulated by the pump 2 to pass through the seat 12 to the radiator 3 (see FIG. 1).

The invention combines with the known thermostat 5 a safety device comprising an auxiliary valve 16 incorporated into the thermostat 5 in parallel with the main valve 14 and normally held closed by retaining means made from a single-acting shape memory alloy whose transformation temperature is slightly above the above-mentioned threshold. The retaining means are adapted to open the auxiliary valve 16 after transformation of the alloy, at least when the thermostat 5 operates.

In the preferred application to liquid cooling circuits of internal combustion engines 1, especially sealed cooling circuits, an alloy is chosen having a transformation temperature in the order of 140° C.±5° C., the normal operation threshold of the thermostat usually being in the order of 90° C. to 100° C. with peaks to 130° C.

In an advantageous embodiment of the invention the thermostat 5 is designed so that after it is released by the retaining means the auxiliary valve 16 is opened by the pressure exerted on its upstream side ("upstream" in relation to the direction of flow) by the cooling liquid.

Although in conventional thermostats the main valve 14 has no openings in it and alone provides the seal at the seat 12 when it is applied thereto, according to the invention the main valve 14 comprises three (for example) windows 18 inside a continuous ring 17 (see FIG. 4). The exterior contour of the windows 18 is delimited by a circle of diameter $\phi_B$. The ring 17 is joined to a central hub 19 by arms 20.

The auxiliary valve 16, whose diameter $\phi_A$ is greater than the diameter $\phi_B$, is normally immobilized by L-shape profile memory alloy retaining clips 21 which cooperate with the rim 22 of a bush 23 in which the casing 8 is housed. When the temperature of the cooling liquid is below the threshold the main valve 14, which is made of rubber overmolded onto metal, is applied to the fixed seat 12 and its windows 18 are closed by the auxiliary valve 16. If the temperature of the cooling liquid rises above the threshold, expansion of the capsule 7 normally moves the main valve 14 and the auxiliary valve 16 downwards at the same time, opening the seat 12. If this downward movement does not occur because the capsule 7 has failed, the temperature of the cooling liquid continues to rise until it reaches the transformation temperature of the memory metal from which the clips 21 are made, the clips 21 then changing from the shape shown in full line in FIG. 3 to that shown in dashed line and releasing the auxiliary valve 16 which is driven upwards (in FIG. 3) from the position shown in full line to that shown in dashed line by the pressure of the liquid discharged by the pump 2 (FIG. 1). The liquid can thereafter pass through the thermostat 5 by virtue of the windows 18, irrespective of its temperature.

FIGS. 5 through 7 show a thermostat according to a second embodiment of the invention. Parts identical or similar to parts of the first embodiment of the invention are identified by the same reference symbols. From the point of view of the general construction, note that the return spring 15 is frustoconical in this case, rather than cylindrical, that the bush 23 provides a bearing surface not for the bottom of the casing 8 but for its flange 24, and that there are four windows 18 and arms 20 rather than three; however, these details do not alter the operation of the thermostat 5. The only noteworthy difference is that the auxiliary valve 16, which is approximately flat in this embodiment, is normally immobilized on the downstream side of the windows 18 by two memory alloy clips 25 attached to two diameterally opposed arms 20 of the main valve 14. The clips 25 are adapted to assume a shape above the alloy transformation temperature which causes them to release the arms 20 and enables the pressurized cooling liquid to move the auxiliary valve 16 upwards.

The embodiment of FIGS. 8 through 11 differs from the previous embodiment in the manner in which the auxiliary valve 16 is normally attached to the casing 8 of the capsule 7. In this embodiment the auxiliary valve 16 carries lugs 26 and the bush 23 carries opposed lugs 27, the lugs 26 and 27 being curved so as to constitute in combination a sort of discontinuous groove open outwardly in which is engaged a shape memory alloy retaining ring 28 adapted to deform outwardly, from the position shown in full line to the position shown in dashed line in FIG. 11, when the transformation temperature is exceeded, which releases the auxiliary valve 16 so that it can be moved upwards in FIG. 8.

In the embodiments previously described the main valve 14 opens against the flow and the auxiliary valve 16 opens with the flow (as schematically represented by the arrows). Of course, the main valve 14 could equally well open with the flow in the manner that will now be described by way of example with reference to FIGS. 12 through 15.

Figure 14:
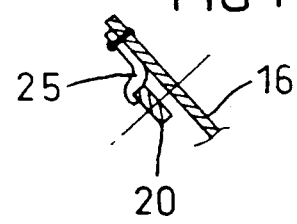
FIG. 14 is a view in cross-section on the line XIV in FIG. 13.
Figure 13:
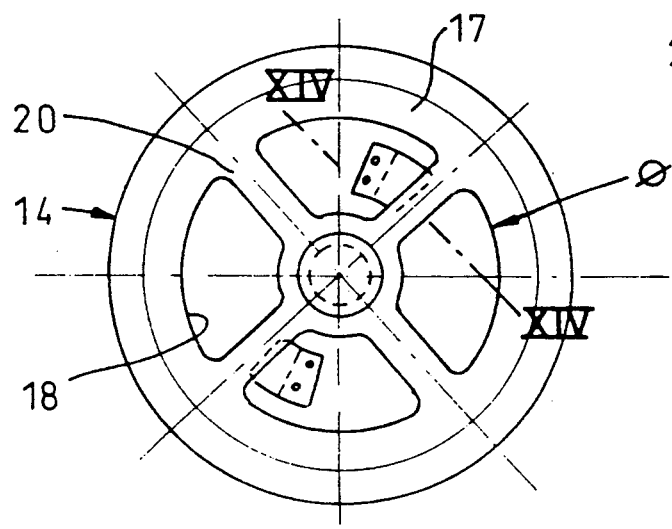

The embodiment of FIGS. 12 through 14 differs from that of FIGS. 5 through 7 only in that the spring 15 acts on the main valve 14 and bears on the upper arms 10, the piston 9 operates in the opposite direction on the main valve 14 to open it in the direction of flow and the casing 8 is fixed to the lower arms 11. In this embodiment it is the piston 9 which is mobile relative to the framework 10, 11 rather than the casing 8, but this does not alter the overall operation.

Figure 15:
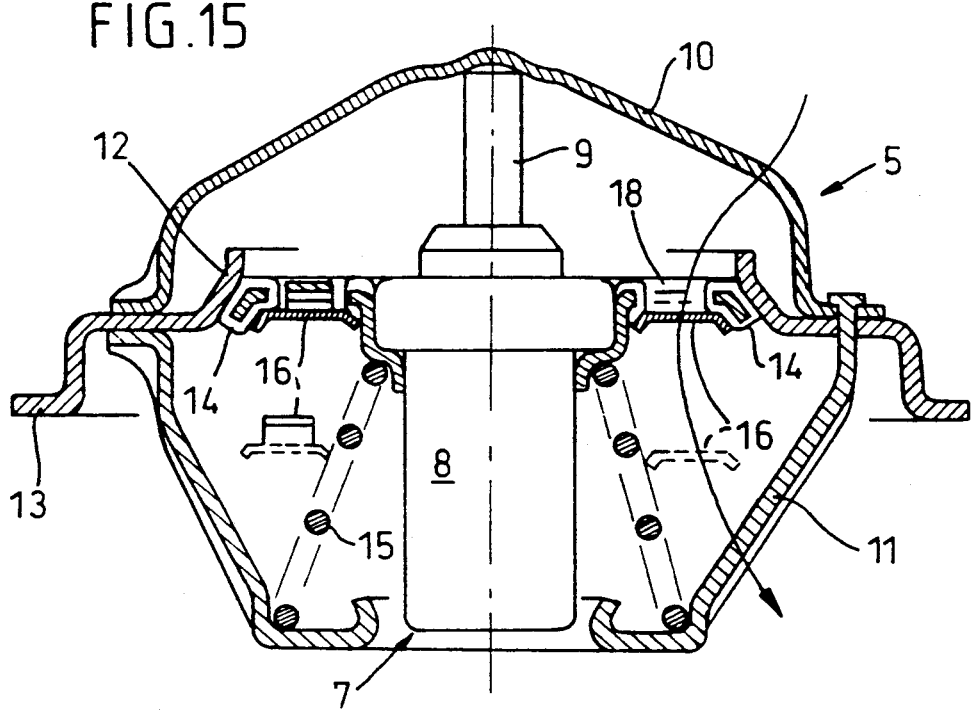
FIGS. 15 and 16 show in axial cross-section two thermostats respectively according to fifth and sixth embodiments of the invention.
Figure 16:
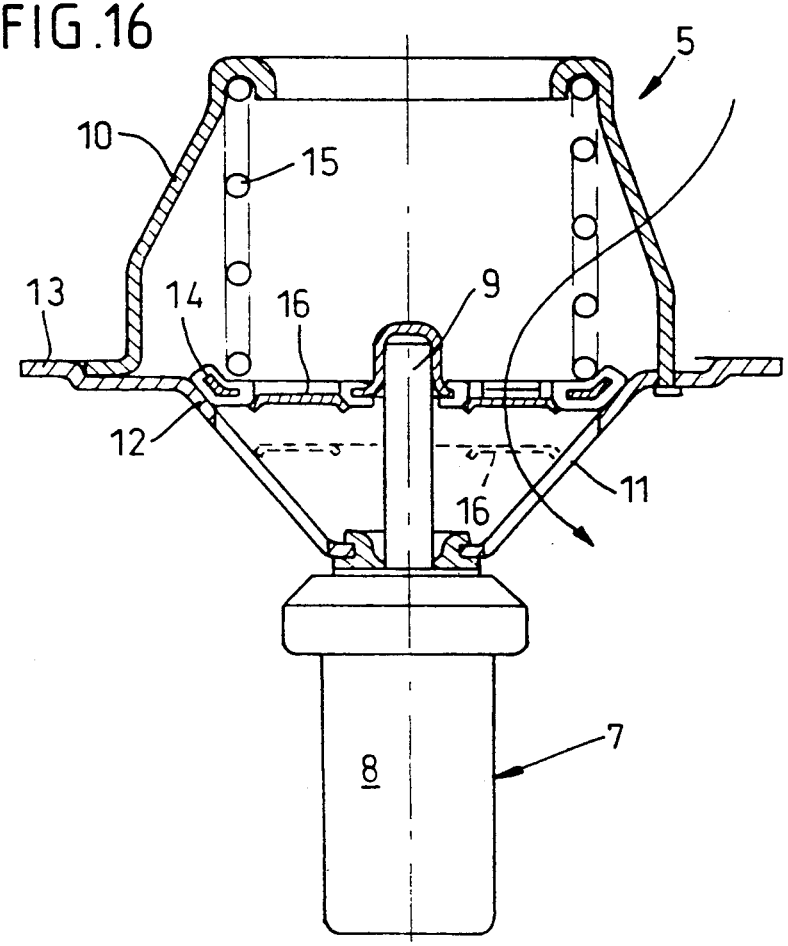

In the embodiments that have just been described the wax capsule 7 is on the upstream side of the flow through the seat 12, in the direction from the engine 1 to the radiator 3. In the embodiments of FIGS. 15 and 16 the wax capsule 7 is on the downstream side of the flow through the seat 12, in the direction from the radiator 3 to the engine 1. The modifications that have to be made to the thermostat 5 will be evident to the man skilled in the art. Note in particular that the FIG. 15 embodiment differs from that of FIGS. 5 through 7 essentially only in that the auxiliary valve 16 is mounted below the main valve 14, that is to say on the downstream side in the direction of flow through the seat 12. Likewise, the FIG. 16 embodiment differs from that of FIGS. 12 through 14 essentially only in that the auxiliary valve 16 is mounted below the main valve 14, that is to say downstream of the seat 12.

In all the embodiments described above which relate to cooling internal combustion engines the cross-section of the auxiliary or safety valve 16 is equal to approximately 75% of the cross-section of the main valve 14. After cooling and reheating, the vehicle driver will notice that the temperature of the cooling water remains abnormally low and this will alert him to the existence of a problem.

The embodiments described so far with reference to FIGS. 3 through 16 utilize the change in shape of a memory alloy member such as 21, 25 and 28 when the transformation temperature is exceeded. However, a change in other mechanical properties such as the elasticity of the memory alloy may also be utilized, as will now be explained by means of four embodiments shown in the lefthand and righthand parts of FIGS. 17 and 18 in which a memory alloy spring 31 operates in opposition to the spring 15 which tends to close the main valve 14, with no auxiliary valve such as the valve 16 being required in this case.

Figure 17:
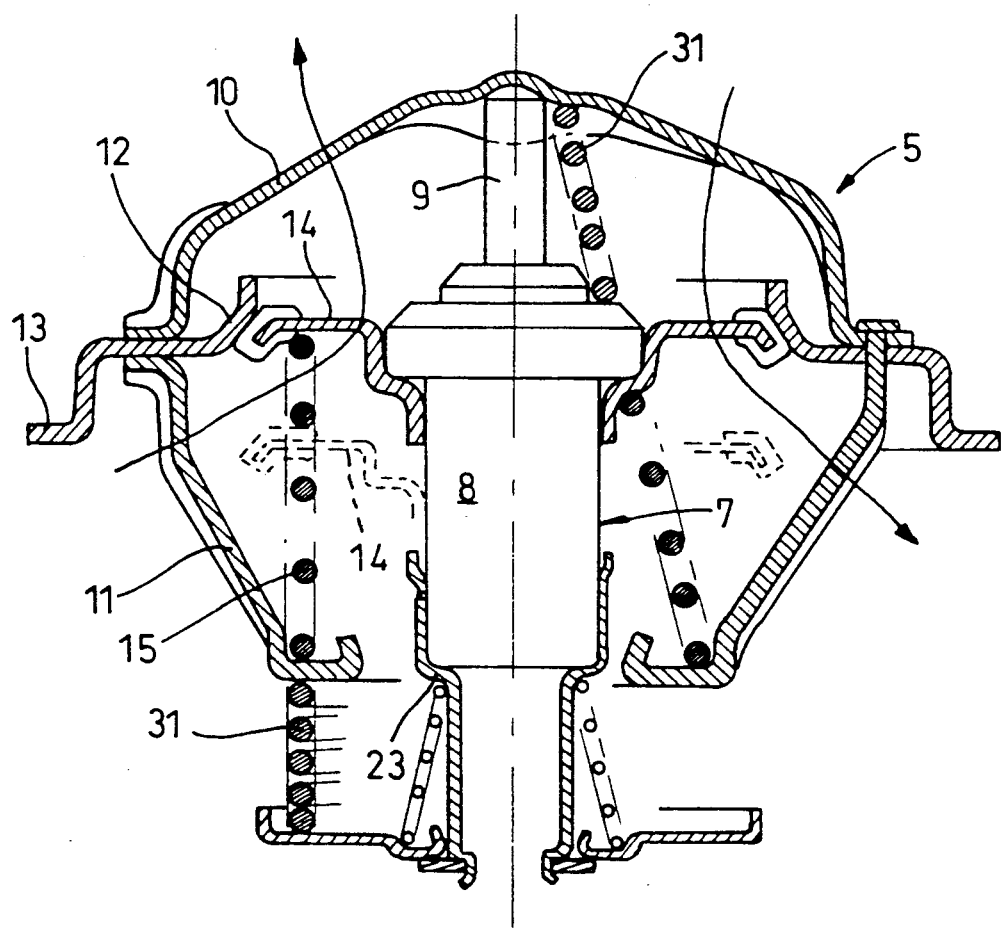
FIG. 17 shows, separated by a vertical median axis, two thermostats respectively according to seventh and eighth embodiments of the invention.

The embodiment shown in the lefthand part of FIG. 17 (to which the FIG. 1 schematic relates) is similar to that of FIG. 3 but its main valve 14 is adapted to close the seat 12 on its own. Opposing the spring 15 which bears on the lower arms 11 and urges the main or only valve 14 in the closing direction there is provided a memory alloy spring 31 acting on the bush 23 providing a bearing surface for the casing 8 and tending to pull the latter downwards. In the righthand part of FIG. 17 (to which the FIG. 2 schematic relates) the shape alloy spring 31, rather than pulling on the casing 8, pushes it to produce the same effect, bearing against the upper arms 10. The embodiment shown in the lefthand part of FIG. 18 (to which the FIG. 1 schematic relates) is similar to that of FIG. 16 but its main valve 14 is adapted to close the seat 12 on its own. In opposition to the spring 15 which bears on the upper arms 10 there is provided a memory metal spring 31 which bears on the casing 8 and/or on the lower arms 11 and tends to open the main or only valve 14. The embodiment shown in the righthand part of FIG. 18 (to which the FIG. 2 schematic relates) is similar to that of FIG. 12 but also comprises an oppositely acting spring 31 made from memory alloy.

Figure 18:
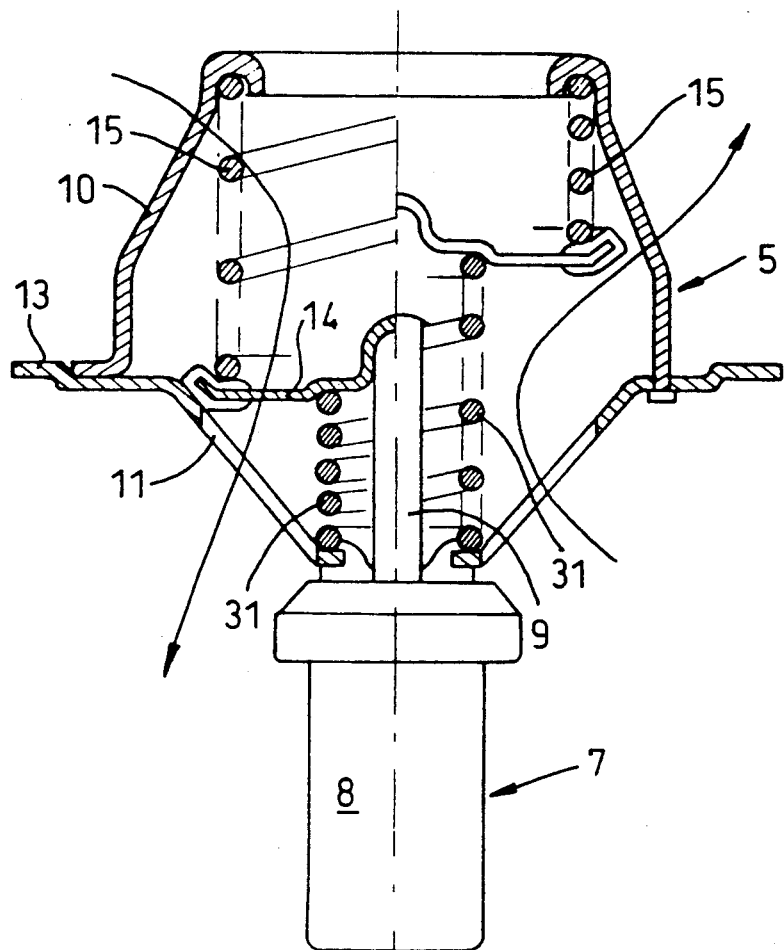
FIG. 18 shows, separated by a vertical median axis, two thermostats respectively according to ninth and tenth embodiments of the invention.

In all the FIG. 17 and 18 embodiments the memory alloy spring 31 is calibrated so that before the alloy transformation temperature is exceeded it exerts a force less than the main spring 15 and when the transformation temperature is exceeded it exerts a force greater than the main spring 15 and so causes the valve 14 to be opened irrespective of the relative positions of the piston 9 and the casing 8.

Although the invention finds its major application in cooling internal combustion engines it may be applied with advantage to boiler draft regulators, especially on solid fuel boilers, in which case the fluid whose flowrate is to be controlled is not a cooling fluid but the combustion-supporting air.

Figure 20:
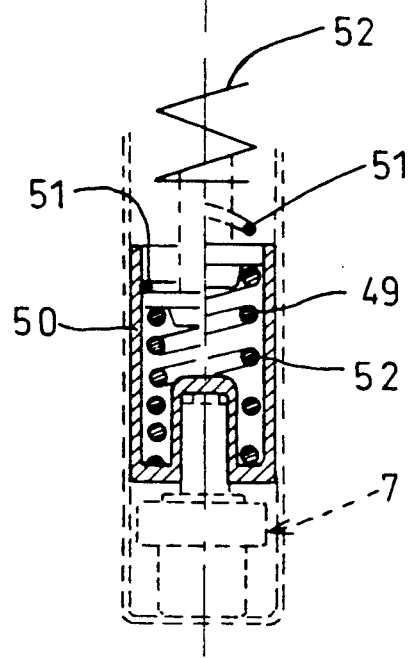
FIG. 20 illustrates the operation of the safety device from FIG. 19.
Figure 19:
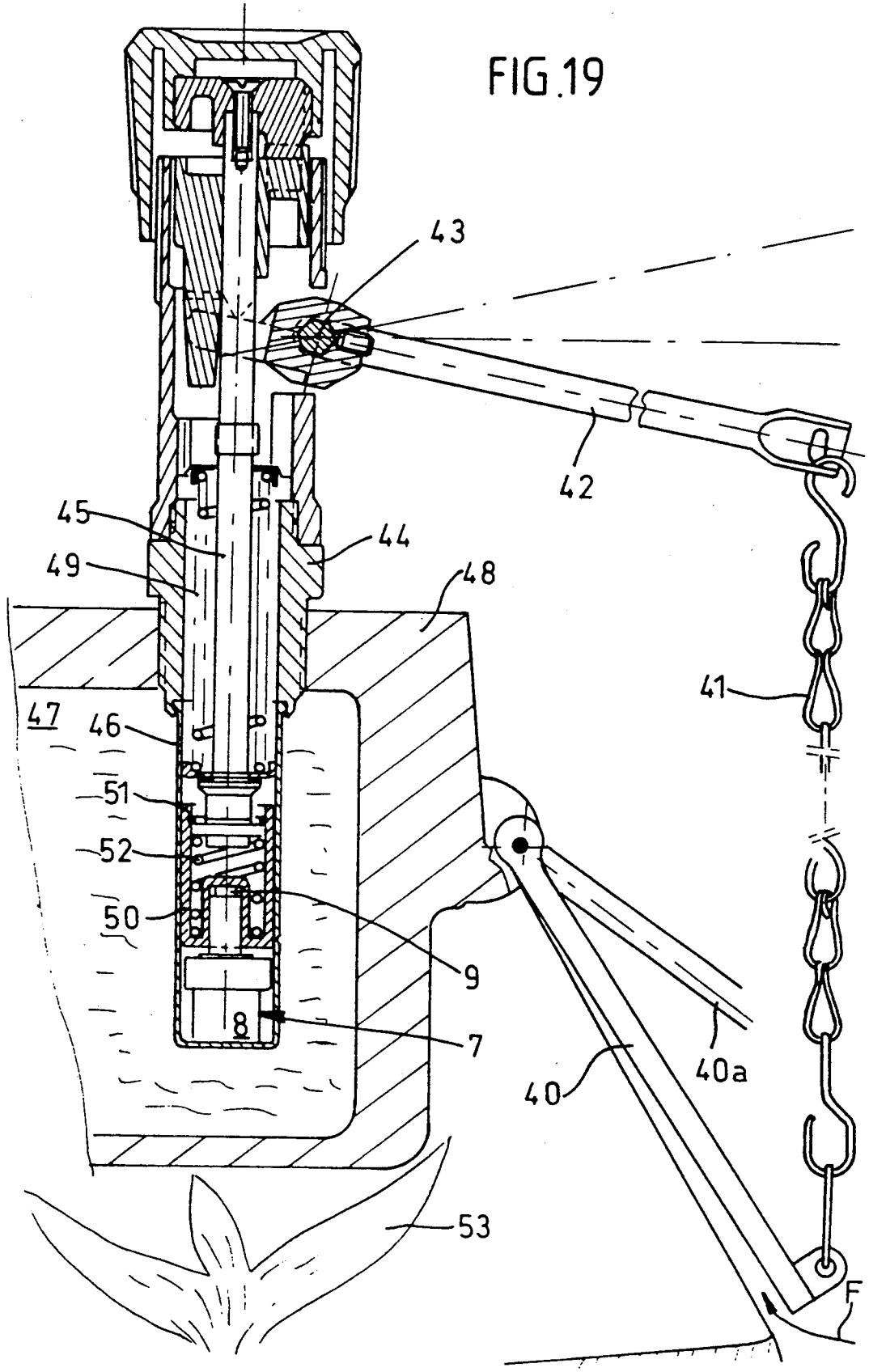
FIG. 19 is a schematic representation of a safety device in accordance with the invention applied to a draft regulator for a solid fuel boiler.

FIGS. 19 and 20 show one such application. Referring to FIG. 19, a regulator of this kind comprises a trapdoor for admitting combustion-supporting air to the boiler, the trapdoor being shown closed at 40 and open at 40a with the admitted air current symbolically represented by an arrow F. The trapdoor 40 is operated via a chain 414 by a lever 42 pivoting about a pin 43 on the body 44 of the regulator. Thrust is applied to the lever 42 against the action of a spring 49 by a sliding rod 45 whose axial position is determined by a wax capsule 70. This capsule is housed in a tube 46 which extends downwardly into the water 47 heated by the boiler 48.

A safety device in accordance with the invention is disposed between the piston 9 of the capsule 7 and the rod 45. This device comprises a sleeve 50 which normally transmits movement of the piston 9 to the rod 45 through an elastic retaining ring 51 housed in a groove on the inside of the sleeve 50 and normally holding a spring 52 housed inside the sleeve 50 compressed so that it is unable to expand. The spring 52 is more powerful than the regulator spring 49. The ring 51 is made from a shape memory alloy so that when its temperature exceeds the regulator setting threshold (100° C., for example) it retracts within the sleeve 50 and so releases the spring 2 which pushes the rod 45 in the direction which closes the trapdoor 40. The burner flame supplied with combustion-supporting air through the trapdoor 40 is schematically indicated at 53. The shutting down of the boiler indicates the occurrence of the fault to the boiler user. The safety device in accordance with the invention is shown separately in FIG. 20, the lefthand part of which shows the position of its component parts when the water temperature is between 20° C. and 95° C. and the righthand part of which shows their position at temperatures above 100° C.

There is claimed:

1. Thermostat actuated by a wax capsule comprising a wax capsule including a casing, a piston, and wax in said casing, which said wax capsule by virtue of relative movement between said casing and said piston caused by thermal expansion of said wax is adapted in normal operation to open a main valve disposed in a fluid circuit immediately after the temperature of said wax capsule exceeds a predetermined first threshold to allow fluid flow through said thermostat, said main valve being closed against fluid flow below said threshold, said thermostat incorporating a safety means adapted not to contribute to the flow of fluid through said thermostat if the temperature is below a second threshold slightly greater than said first threshold but to allow the flow of fluid through the thermostat if the second threshold is exceeded irrespective of the opening of said main valve by said wax capsule, wherein said safety means incorporated in said thermostat includes a moving means made from a single-acting memory alloy for irreversibly moving as a result of a memory of said memory alloy from a first position to a second position at a transformation temperature of said memory alloy approximately equal to said second threshold and which movement thus allows fluid flow through said thermostat.

2. Thermostat according to claim 1 for applications in which said fluid is the cooling fluid of an internal combustion engine; wherein said safety means incorporated in said thermostat comprises an auxiliary valve in parallel with said main valve; and wherein said moving means is a retaining means for retaining said auxiliary valve normally closed in the first position and for allowing said auxiliary valve to open by movement to the second position after transformation of said memory alloy at least during flow of said fluid.

3. Thermostat according to claim 1 for applications in which said fluid is the cooling fluid of an internal combustion engine wherein the memory alloy means comprises a first spring acting in opposition to a second spring adapted to close said main valve.

4. Thermostat according to claim 1 wherein said memory alloy moving means has a transformation temperature in the order of 140° C.±5° C.

5. Thermostat according to claim 2 wherein after said auxiliary valve is released by the change in the position of said retaining means said auxiliary valve is adapted to be opened by pressure exerted on its upstream side relative to the direction of flow of said cooling liquid by said cooling liquid.

6. Thermostat according to claim 2 wherein said main valve comprises windows within a continuous ring joined to a central hub by arms and the memory alloy retaining means are clips normally attaching said auxiliary valve to said arms on the downstream side of said main valve.

7. Thermostat according to claim 6 wherein said clips cooperate with said arms.

8. Thermostat according to claim 2 wherein the cross-section of said auxiliary valve is approximately 75% of the cross-section of said main valve.

9. Thermostat according to claim 1 for applications in which said fluid is combustion-supporting air in a boiler wherein said thermostat is incorporated into a draft regulator and operates on an air inlet trapdoor.

10. Thermostat according to claim 9 wherein said memory alloy has a transformation temperature in the order of 100° C.

11. Thermostat according to claim 2 wherein said retaining means in the first attaches said auxiliary valve on the downstream side of said main valve.

12. Thermostat as claimed in claim 1 wherein said safety means includes an auxiliary valve in parallel with said main valve which is openable by movement of said moving means from the first to the second position.

13. Thermostat as claimed in claim 1 wherein said moving means in moving from the first position to the second position moves said main valve to the open position.

* * * * *